United States Patent [19]
Replogle

[11] 3,949,361
[45] Apr. 6, 1976

[54] SIGNAL SYSTEM FOR AUTOMOTIVE VEHICLE

[76] Inventor: Daniel C. Replogle, 406 Spang St., Roaring Spring, Pa. 16673

[22] Filed: Mar. 4, 1974

[21] Appl. No.: 447,485

[52] U.S. Cl. .................... 340/66; 315/77; 340/71
[51] Int. Cl.² ........................................ B60Q 1/26
[58] Field of Search ........... 340/52 R, 52 F, 62, 66, 340/67, 71, 72, 262; 315/77, 80; 200/61.89; 180/103, 106; 73/495; 335/17, 136, 177, 178, 183; 317/155.5

[56] References Cited
UNITED STATES PATENTS

| | | | |
|---|---|---|---|
| 2,144,402 | 1/1939 | Crawford et al. | 335/177 |
| 2,526,611 | 10/1950 | Rodrick | 340/72 |
| 3,110,012 | 11/1963 | Manning | 340/66 |
| 3,676,844 | 7/1972 | Hendrickson | 340/71 |

Primary Examiner—John W. Caldwell
Assistant Examiner—Joseph E. Nowicki
Attorney, Agent, or Firm—Melvin A. Crosby

[57] ABSTRACT

A signal system for an automotive vehicle, especially a system for giving an early signal to a following vehicle and particularly characterized in that an amber light visible from rearwardly of the vehicle is illuminated when the engine is running and the vehicle is not accelerating or braking. When the vehicle is accelerating by depressing the accelerator pedal the amber light changes to green and when the vehicle is braked as by applying the brake pedal, the signal light changes to red. When braking while the turn signal is operated, one red lamp is illuminated continuously while another is illuminated intermittently and alternately with the amber lamps. When the four-way flashers are turned on all the turn signal lamps alternate with the amber lamps. In this manner, clear and distinct signals are provided, especially for a vehicle following the vehicle having the signal system thereon.

10 Claims, 5 Drawing Figures

SIGNAL SYSTEM FOR AUTOMOTIVE VEHICLE

The present invention relates to vehicle signal light systems and is particularly concerned with a system of this nature which will provide an early signal to the driver of a vehicle which is following the vehicle having the signal light system thereon. Vehicle signal light systems are known, including systems in which a green light is visible from rearwardly of the vehicle when the accelerator is depressed while a yellow or amber light is visible when the accelerator is released and a red light is visible when the brake pedal is depressed.

The present invention is concerned with a signal light system of this general nature but represents a substantial improvement thereover and includes special features which makes the signal light system more reliable and which provides a more distinct pattern of signalling lights.

A particular object of the present invention is the provision of a relatively simple but highly effective signal light system for a vehicle, especially a signal light system visible from rearwardly of the vehicle.

Another object is the provision of a signal light system in which, in one signal mode, flashing lights are provided for whereby the signal light system is extremely distinct and is thus certain to be observed by a driver of a vehicle which is following the vehicle provided with the signal light system.

A still further object is the provision of a signal light system that can be readily incorporated in vehicles of new manufacture and which can also be adapted to existing vehicles.

A still further object of the invention is the provision of a novel relay for incorporation in a vehicle signal light system of the nature disclosed which is efficient and reliable.

BRIEF SUMMARY OF THE INVENTION

According to the present invention, a vehicle is provided with red, amber and green lamps which, when energized, are visible from rearwardly of the vehicle. According to known practices, the signal lamps are in pairs with one lamp of each pair on a respective side of the longitudinal center of the vehicle. The red lights referred to may comprise the vehicle stop lights, or the red lights may be separate from the vehicle stop lights. The system according to the present invention is compatable with and operates with the front turn signal lights.

The system according to the present invention incorporates a relay having opposed actuating coils and an armature under the influence of the coils. When the ignition switch is turned on, one of the coils is energized and pulls the armature toward the coil, and closes a set of contacts connected in circuit with the amber lamps, so that whenever the ignition switch is in its "ON" position, the circuit for the amber lamps is at least partially prepared.

One side of the coil referred to is connected to the ignition switch and the other side is connected to ground by way of the red signal lamps at the rear of the vehicle. The current drawn by the coil will actuate the armature of the relay but is not, however, sufficient to illuminate the red lamps.

The other coil of the relay, and which is opposed to the first described coil, is connected between the ignition switch and ground via a switch actuated by the accelerator so that whenever the accelerator pedal is depressed the second coil is energized. This second coil is large enough to overcome the first coil and moves the armature of the relay to a second position wherein a circuit is completed to the green lamps at the rear of the vehicle, while the circuit to the amber lamps is interrupted.

The vehicle also has a switch operated by the brake pedal and when this switch is closed, the aforementioned red lamps are illuminated. When the red lamps are illuminated, both ends of the first mentioned coil go to the same potential and this coil is thereby deenergized so that if, at that time, the amber lamps are illuminated, they will become extinguished because the armature will return to its centered position.

The aforementioned red lights are also connected in circuit with a turn signal switch so that actuating the turn signal switch will cause intermittent energization of a respective one of the red lamps. This intermittent energization when combined with braking during the turning operation also permits intermittent energizing of the first coil. Thus the amber lights will flash alternately with the respective red turn signal. Similarly, if both red lamps are intermittently energized, as by closing a four-way flasher switch, the amber lamps will be alternately illuminated with the red lamps.

During braking on the straighaway, only the red brake lamps are illuminated.

The objects referred to above as well as other objects and advantages of the present invention will become more apparent upon reference to the following detailed specification taken in connection with the accompanying drawings in which.

DETAILED DESCRIPTION OF THE INVENTION

Figure 1:
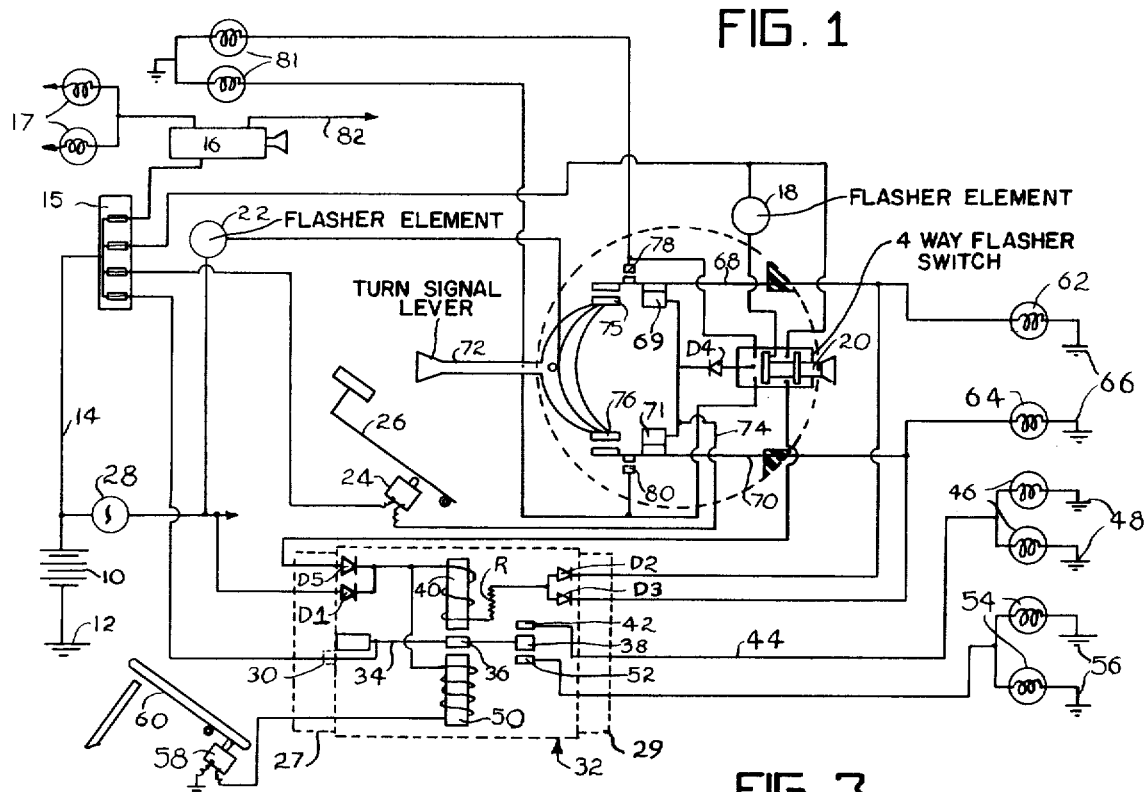
FIG. 1 is a schematic representation of a preferred circuit arrangement for the present invention.

Referring to the drawings somewhat more in detail, 10 indicates the vehicle battery having one side grounded at 12, with the other side connected to a wire 14. Wire 14 is connected via a fuse panel 15 to one side of a light switch 16 for controlling the vehicle head lamps 17 and to one side of a four-way flasher element 18 and to one terminal of a manually operable four-way flasher switch 20.

Wire 14 is also connected via fuse block 15 to a terminal 30 of a relay 32, said terminal 30 being connected to normally centered moveable blade 34 of the relay. Blade 34 carries an armature 36 and contact means 38. Wire 14 is also connected via fuse block 15 to one side of a normally open switch 24, which is adapted for being closed by the vehicle brake pedal 26 when the brake pedal is actuated. Wire 14 is also connected directly to one side of the vehicle ignition switch 28, with the other side of switch 28 connected to one side of flasher element 22 and through a diode D1 to one end of a first relay coil 40.

The first coil of the relay 40, when energized, will pull armature 36 upwardly and cause contact means 38 to engage a contact 42. Contact 42 is connected by a wire 44, with one side of a pair of amber lamps 46, forming first signal lamp means, the other sides of which are connected to ground at 48. The amber lamps, as mentioned, are positioned one on each side of the rear of the vehicle.

Relay 32 has a further coil 50 which, when energized, pulls armature 36 downwardly and causes contact means 38 to close on a contact 52. Contact 52 is connected to one side of the pair of green lamps 54, forming second signal lamp means, the other side of each of which is grounded as at 56. Similarly, to the amber lamps 46, one of the green lamps is positioned on each side of the vehicle at the rear.

Coil 50 is substantially larger than coil 40 as, for example, by having more turns, and will overcome coil 40 anytime that both of the coils are energized. One side of coil 50 is also connected via diode D1 with the side of ignition switch 28 opposite wire 14 so that the coils 40 and 50 can be energized only when the ignition switch is closed. The other side of coil 50 is connected to one side of a normally open switch 58 which is adapted to being closed when the accelerator pedal of the vehicle, indicated at 60, is depressed.

The side of coil 40 opposite diode D1 is connected via respective diodes D2, D3, with one side of respective red lamps 62 and 64, the other sides of which are connected to ground as at 66. The amount of current which will flow through coil 40 can be limited by a resistor R so that when the ignition switch 28 is closed coil 40 will be energized and will draw armature 36 upwardly but the amount of current which will flow through the coil will not be sufficient to cause illumination of lamps 62 and 64. Diodes D2 and D3 provide isolation of lamps 62 and 64 from one another for turn signal purposes.

The sides of lamps 62 and 64 to which diodes D2 and D3 are connected are also connected to the respective blades 68 and 70 of a turn signal switch having a moveable lever 72. When lever 72 is in the neutral position; in which position it is illustrated in FIG. 1; the blades 68 and 70 are closed on contacts 69 and 71 which are connected to the wire 74 leading to the side of stop switch 24 opposite its connection to wire 14.

Thus, with the turn signal lever 72 set in its neutral position, depressing the brake pedal 26 will bring about illumination of both the red lamps 62 and 64. However, if turn signal lever 72 is shifted, for example, downwardly, contact 75 connected to the opposite side of flasher unit 22 from wire 14 will contact blade 68, moving it against contact 78 and, at the same time, interrupting engagement with contact 69. When lever 72 is so shifted, current will flow through lamp 62 and respective one of lamps 81, causing them to be illuminated, but this illumination will be intermittent because of the flasher element 22.

In the normal course of events, the accelerator pedal 60 will be released and braking will occur while the turn signal lever 72 is actuated and, thus, coil 50 will be deenergized, whereas coil 40 will be alternately energized and deenergized to coincide with flasher action. Thus, red lamp 64 under control of brake light switch 24 will be constantly illuminated, while lamp 62 under control of flasher 22 will flash alternately with lamps 46.

The red lamps operated by the brake switch 24 could be separate from the turn signal lamps, if so desired, so that when turning, a red turn lamp would flash intermittently while a pair of red stop lamps would be illuminated while the brake pedal was actuated.

Contacts 78 and 80 also control the front turn signals 81 on the vehicle.

Still further, if the emergency four-way flasher switch 20 is actuated, current will be supplied via diode D4 to contacts 69 and 71 and therethrough to blades 68 and 70. D4 diode can be eliminated but flashing action would not continue in front while brake pressure is applied.

At this time, all the turn signal lamps 62, 64 and 81 will flash due to the opening and closing of flasher element 18. The actuation of switch 20 will also supply current via a further diode D5 to one end of the coil 40 so that, even if the ignition switch 28 is open, coil 40 will be controlled so that the amber lights 46 will flash alternately with the turn signal lights on the front and rear of the vehicle. This will provide a particularly discernable signal from at aleast rearwardly of the vehicle that an emergency situation exists.

It will be apparent that other circuit arrangements could be arrived at for effecting the type of control that has been described in detail above. The particular relay arrangement disclosed and described is the one which is preferred. The particular turn signal switching device is subject to substantial variation and is merely illustrated in a schematic form. Other turn signal switch arrangements can be employed.

It will also be apparent that the red lamps under the control of the brake switch could be different from those under the control of the turn signal switch.

The vehicle could, of course, have parking lights under the control of switch 16.

Figure 2:
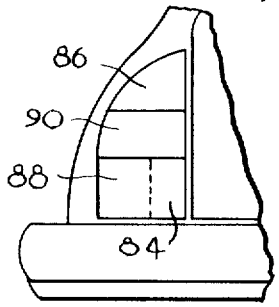
FIG. 2 is a fragmentary perspective view showing one arrangement of a rear light constructed for use with the present invention.

FIG. 2 schematically shows one way in which a typical rear lighting fixture might be arranged. The lighting fixture might have a lamp 62 or 64 set in about the area indicated by arrow 86 in the tail light fixture, while one of the lamps 46 might be located in region indicated at 88.

A green lamp 54 or 56 might be located in the area marked at 90 and back up lamps might be in the region indicated at 84. It will be understood that there are many possible arrangements that could be made of the lamps and that the lamps could vary in size, each from the other.

The important thing about the invention is the provision of an arrangement whereby, under certain conditions, amber lamps will flash alternately with red lamps, thereby providing a much more pronounced and easily discernable signal than has heretofore been the case with automobile signalling systems.

Figure 1A:
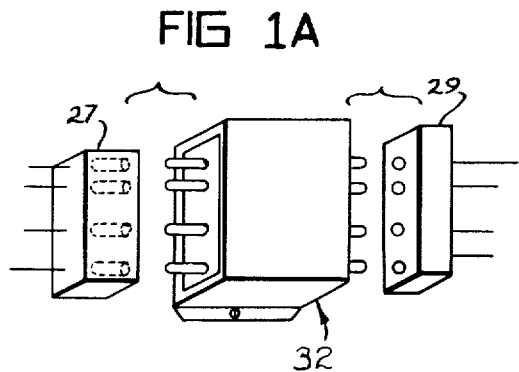
FIG. 1A is an elevational perspective view of the relay of FIG. 1.

FIG. 1A shows how the wire leading to the relay could be connected to connector members 27 and 29 for plugging into the relay on opposite sides. Nonuniform distribution of the prongs and sockets on the relay and connector members prevent making improper connections when connecting members 27 and 29 to the relay.

Figure 3:
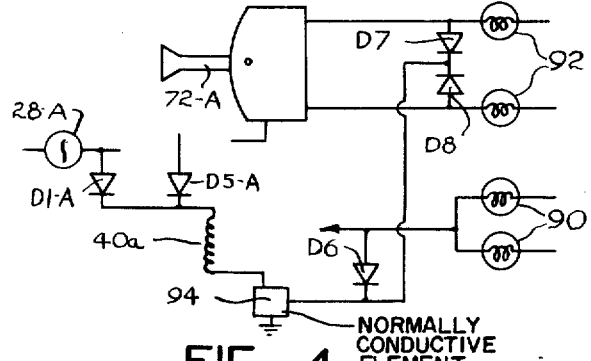
FIG. 3 is a fragmentary view of a modified circuit.

FIG. 3 shows a modification in which the stop lamps 90 are separate from turn signal lamps 92. In FIG. 3, the smaller coil of the relay, the coil being indicated at 40a, has one end connected through diode D1a with ignition switch 28a and through diode D5a with the four-way flasher switch.

The other end of coil 40a is connected to ground and in series with the coil is a normally conductive component 94, a relay, for example. Component 94 has a control terminal which will make the component nonconductive when a voltage signal is supplied thereto. The control terminal is connected through diode D6 with the wire leading to stop lamps 90 and through diodes D7 and D8 with respective ones of the turn signal lamps 92. The diodes are poled toward the control terminal so that energization of any of the lamps will make component 94 go to nonconduction.

In operation of the modification of FIG. 3, 1 whenever the ignition switch is "ON" and the stop lamp switch is not closed and neither turn signal lamp is actuated, coil 40a will be energized by current flowing therethrough and through component 94. Whenever the brake pedal is depressed, the anode side of diode D6 will go to battery voltage, and this will supply a signal to the control terminal of component 94 to make the component nonconductive thereby to deenergize coil 40a and release the armature.

Similarly, whenever turn signal lever 72a is adjusted to supply current intermittently to either of turn signal lamps 92, the respective diode D7, D8, will cause the supply of a voltage signal to the control terminal of component 94 to make the component nonconductive thereby to deenergize coil 40a simultaneously with the supply of current to the respective turn signal lamp. It will be apparent that the circuit of FIG. 3 also provides for intermittent operation of the amber lamps with whichever one of the turn signal lamps is actuated.

As before, actuation of the accelerator will energize the larger coil of the relay and cause the green lamps to come on.

The system of FIG. 3 also provides for operation of the amber lamps alternately with the lamps which flash when the four-way flasher switch is actuated. The connections of the four-way flasher switch are not illustrated in FIG. 3, and the parts of the relay other than the smaller coil 40a are also not illustrated in FIG. 3 and are the same as what is shown in FIG. 1.

The early signalling, or early warning signal system, according to the present invention promotes safe conditions of vehicle operations because the driver of a vehicle following a vehicle provided with a signalling system according to the present invention will always be clearly apprised of the conditions of operation of the vehicle in front.

More, specifically, the driver of the following vehicle will always know when the accelerator pedal of the vehicle in front is depressed and when the brake pedal is depressed and, in particular, the vehicle having the signalling system according to the present invention gives a prominent signal whenever a turn is to be made or whenever the emergency flasher system is actuated.

Figure 4:
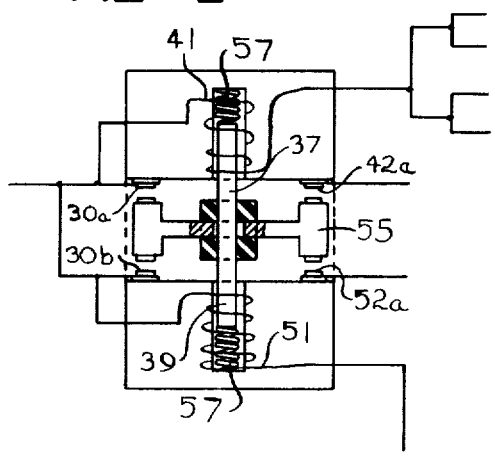
FIG. 4 shows another form which the relay can take.

FIG. 4 shows a different form for the relay in which armature 37 is associated with smaller coil 41, while armature 39 is associated with larger coil 51. A block of insulation material 53 connected to the armature carries a contact blade 55 which closes on contacts 30a and 42a when coil 41 prevails and on contacts 30b and 52a when coil 51 prevails. Springs are provided at 57 for centering the armature structure when neither coil is energized. Either of the relays illustrated is satisfactory and both operate in the same manner.

Modifications may be made within the scope of the appended claims.

What is claimed is:

1. In a signal system for a vehicle having a source of electric power with first and second terminals, an accelerator pedal, a brake pedal and a stop switch actuated thereby, a turn signal switch, stop and turn signal lamp means, the stop and turn signal lamp means being connected to said first terminal, said stop switch and turn signal switch being connected in parallel between said stop and turn signal lamp means and said second terminal; second and third signal lamp means each connected to said first terminal and first and second relay contacts connected to said second and third lamp means respectively, a movable contact connected to said second terminal, a first relay coil energizable to move said movable contact into engagement with said first contact and connected to said second terminal, a normally conductive control mans connecting said first coil to said first terminal, a second coil connected to said second terminal and energizable to move said movable contact into engagement with said second contact regardless of the condition of energization of said first coil, a normally open accelerator pedal actuated switch connected between said second coil and said first terminal and closing in response to actuation of the accelerator pedal, and means operable in response to the energization of said stop and turn signal lamp means for making said control means go to nonconduction.

2. A signal lamp system according to claim 1 in which said stop and turn signal lamp means comprise one and the same lamp means.

3. A signal lamp system according to claim 1 in which said stop and turn signal lamp means comprise respectively different lamp means.

4. A signal lamp system according to claim 1 in which said second signal lamp means are amber, said third signal lamp means are green and said stop and turn signal lamp means comprise red lamp means.

5. A signal lamp system according to claim 1 in which said second lamp means comprise a pair of amber lamps, said third lamp means comprise a pair of green lamps, and said stop and turn signal lamp means comprise at least one pair of red lamps, one of each pair of lamps being disposed on a respective side of the center of the vehicle at the back so the lamps are visible from rearwardly of the vehicle when energized.

6. A signal lamp system according to claim 1 which includes an ignition switch interposed between said turn signal switch and said second terminal.

7. A signal lamp system according to claim 1 in which said control means includes diode means and said stop and turn signal lamp means are connected in series between said first coil and said first terminal.

8. A signal lamp system according to claim 7 in which said first coil when energized does not draw enough current to cause the stop and turn signal lamp means in series therewith to become illuminated.

9. A signal lamp system according to claim 1 in which said control means includes a control terminal and is operable in response to a voltage signal supplied to the control terminal to make said control means nonconductive, and diode means connected between said control terminal and said stop and turn signal lamp means and poled such that a supply of energizing voltage to any of said stop and turn signal lamp means will make said control means nonconductive and thereby deenergize said first coil.

10. A signal lamp system according to claim 1 in which said stop and turn signal lamp means comprise lamps for the turn signal and lamps for the stop signal, said control means comprising a control terminal and going to nonconduction in response to the supply of a voltage signal to the control terminal, and diodes connecting said control terminal to said turn signal lamps and stop signal lamps and poled to supply a voltage signal to said control terminal when any of the turn signal and stop signal lamps are energized.

* * * * *